United States Patent Office.

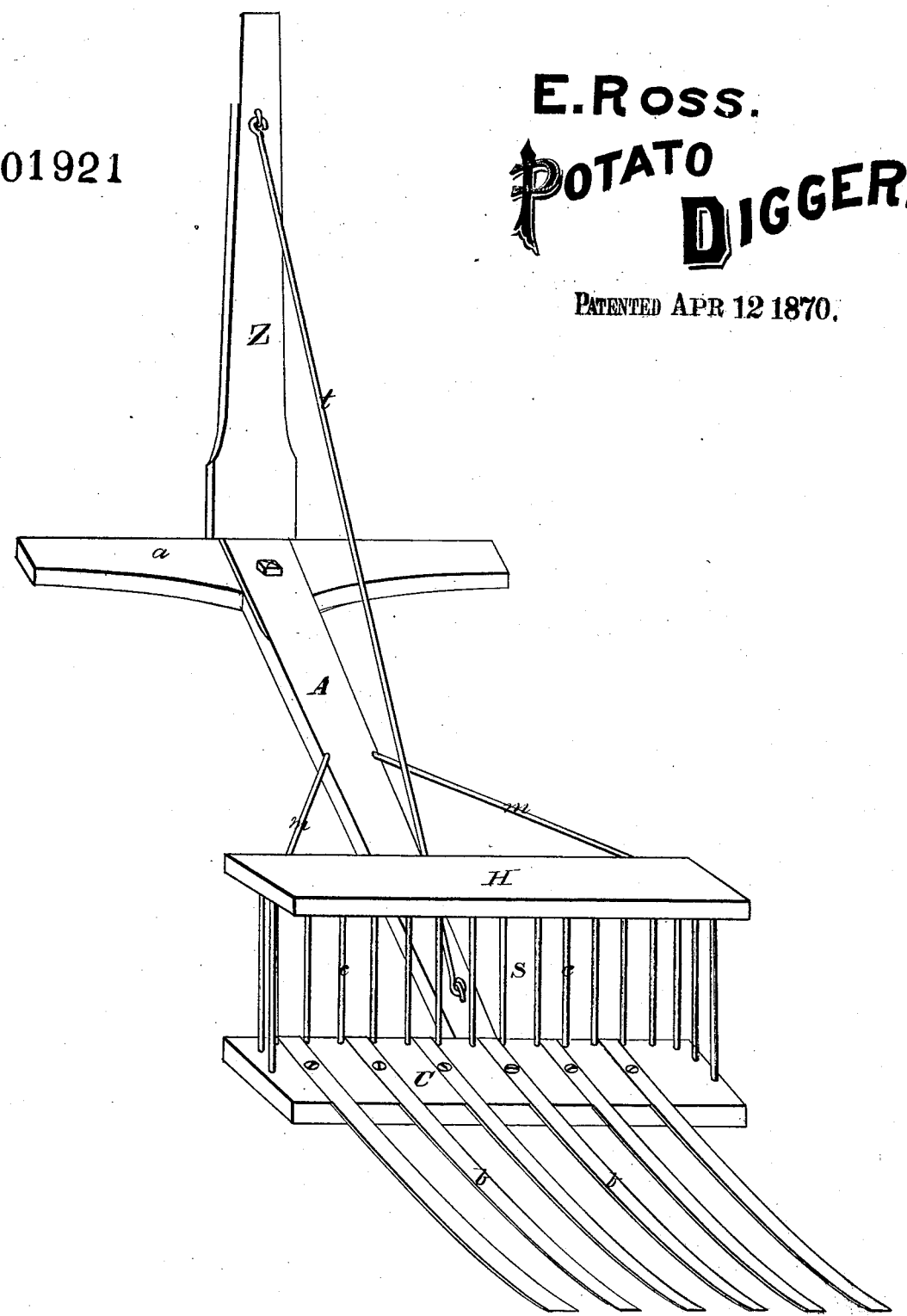

ENOCH ROSS, OF WASHINGTON, IOWA

Letters Patent No. 101,921, dated April 12, 1870.

IMPROVEMENT IN POTATO-DIGGERS.

The Schedule referred to in these Letters Patent and making part of the same.

*To all whom it may concern:*

Be it known that I, ENOCH ROSS, of Washington, in the county of Washington and State of Iowa, have invented a new and valuable Improvement in Potato-Diggers; and I do hereby declare that the following is a full, clear, and exact description of the construction and operation of the same, reference being had to the annexed drawings making a part of this specification, and to the letters and figures of reference marked thereon.

Figure 1 of the drawings is a representation of my invention in perspective.

My invention relates to means for taking potatoes from hills, and consists in combining a riddle and toothed spade together in the manner hereinafter described.

The letter A of the drawings designates the shaft of the digger, arranged with a handle, $a$, and the bent teeth or prongs $b\ b$, secured to the bar C.

The riddle S is formed on the bar C, by securing thereto the wires $c\ c$, which are also fastened to the bar H at their upper ends. Thus the bars C and H form the sides of the riddle, while the bottom and ends are formed by the wires $c\ c$.

The upper bar H is braced by the rods $m\ m$, attached to the shaft A.

Secured to the top of the shaft A is the lever Z, which is strengthened and secured in position by the connecting-brace $t$, joining its upper end to the lower portion of the shaft.

When it is desired to take the potatoes from the hills, the prongs of the fork are introduced into the hill by placing the foot on the bar C, as an ordinary spade is forced into the ground. Then, by pulling the lever Z, the fork, with its load of earth and potatoes, is lifted from the earth, the handle $a$ becoming the fulcrum.

When the fork is raised to its full height, the earth and potatoes fall therefrom into the riddle S, through the spaces between the wires of which the earth falls, leaving the potatoes.

The cross-bar $a$ is attached to the end of the handle in a strong and effective manner, and is designed not only to serve for the grasp of the hands when the digger is introduced into the ground, but also is adapted to serve as the fulcrum in the shaking operation after the fork with its load has been raised out of the ground. In this capacity, its length prevents the end of the handle from working into the ground, and at the same time keeps the fork from falling over.

What I claim as my invention, and desire to secure by Letters Patent, is—

In combination with the fork A and riddle S, the cross-bar $a$ and lever Z, connected to the end of the handle, and braced by the rod $t$, all constructed and arranged to operate in the manner and for the purposes herein shown and described.

In testimony that I claim the above, I have hereunto subscribed my name in the presence of two witnesses.

ENOCH ROSS.

Witnesses:
H. SCOFIELD,
WM. SCOFIELD.